(12) United States Patent
Voss et al.

(10) Patent No.: US 8,880,894 B2
(45) Date of Patent: Nov. 4, 2014

(54) PUBLIC KEY INFRASTRUCTURE-BASED FIRST INSERTED SUBSCRIBER IDENTITY MODULE SUBSIDY LOCK

(75) Inventors: Joel Voss, Elkhorn, WI (US); Joseph Hansen, Williams Bay, WI (US); Kent Rager, Fort Wayne, IN (US)

(73) Assignee: Motorola Mobility LLC, Chicago, IL (US)

( * ) Notice: Subject to any disclaimer, the term of this patent is extended or adjusted under 35 U.S.C. 154(b) by 1162 days.

(21) Appl. No.: 12/492,327

(22) Filed: Jun. 26, 2009

(65) Prior Publication Data

US 2010/0169660 A1 Jul. 1, 2010

Related U.S. Application Data

(60) Provisional application No. 61/141,491, filed on Dec. 30, 2008.

(51) Int. Cl.
| | |
|---|---|
| *H04L 9/32* | (2006.01) |
| *H04L 9/08* | (2006.01) |
| *H04W 12/04* | (2009.01) |
| *H04L 9/00* | (2006.01) |
| *H04L 29/06* | (2006.01) |

(52) U.S. Cl.
CPC ............ *H04L 63/06* (2013.01); *H04L 9/0894* (2013.01); *H04L 2209/80* (2013.01); *H04W 12/04* (2013.01); *H04L 9/0838* (2013.01); *H04L 9/006* (2013.01)
USPC ........................................................ 713/183

(58) Field of Classification Search
CPC ............................. G06F 21/31; H04L 63/083
USPC ........................................................ 713/183
See application file for complete search history.

(56) References Cited

U.S. PATENT DOCUMENTS

| | | | |
|---|---|---|---|
| 6,314,283 B1 | 11/2001 | Fielden | |
| 7,088,988 B2 | 8/2006 | Kelkar et al. | |
| 2004/0133781 A1* | 7/2004 | Guillou | 713/170 |
| 2004/0148356 A1* | 7/2004 | Bishop et al. | 709/206 |
| 2004/0268142 A1* | 12/2004 | Karjala et al. | 713/200 |
| 2006/0129848 A1* | 6/2006 | Paksoy et al. | 713/193 |
| 2007/0258595 A1* | 11/2007 | Choy | 380/278 |
| 2008/0003980 A1* | 1/2008 | Voss et al. | 455/411 |
| 2008/0005577 A1 | 1/2008 | Rager et al. | |
| 2008/0209206 A1* | 8/2008 | Vaha-Sipila et al. | 713/155 |
| 2008/0289206 A1* | 11/2008 | Mastrobattista | 33/630 |
| 2009/0006852 A1* | 1/2009 | Qiu et al. | 713/176 |
| 2009/0037729 A1* | 2/2009 | Smith et al. | 713/158 |

OTHER PUBLICATIONS

Kent Rager et al.; "Using Network Authentication to Counter Subscriber Identity Module Card Man-in-the-Middle Subsidy Lock Attack", U.S. Appl. No. 12/188,785, filed Aug. 8, 2008.

* cited by examiner

*Primary Examiner* — William Goodchild
(74) *Attorney, Agent, or Firm* — Fox Rothschild LLP

(57) ABSTRACT

A method, telecommunication apparatus, and electronic device for securely creating an identity data block are disclosed. A secure memory 208 may store a unique private key 326 associated with a unique public key 328. A processor 204 may generate the identity data block 332 in the secure memory 208 using the unique private key 326. The processor 204 may erase the unique private key 326 from the secure memory 208.

20 Claims, 7 Drawing Sheets

100

400

PUBLIC KEY INFRASTRUCTURE-BASED FIRST INSERTED SUBSCRIBER IDENTITY MODULE SUBSIDY LOCK

CROSS REFERENCE TO RELATED APPLICATIONS

The present application claims priority from U.S. Provisional Patent Application No. 61/141,491, filed Dec. 30, 2008.

FIELD OF THE INVENTION

The present invention relates to a method and system for executing a subsidy lock on a telephone handset. The present invention further relates to implementing a robust subsidy lock after the point of manufacture.

INTRODUCTION

The cost of a cellular telephone to a user may be prohibitively expensive. This expense in turn may result in users not purchasing access to a cellular telephone network. The expense may increase as more features are added to the network, such as data, media content, and other features that utilize a more complex user handset. One way that network providers may increase the number of network subscribers is by subsidizing the cost of a user handset. When subsidizing the user handset, the network provider may want to prevent the network subscriber from using the user handset with a different network for a set period of time.

The mobile telephones may be designed to only be allowed to work with certain subscriber identity module (SIM) cards or networks. One method may be to use a mobile telephone with a subsidy lock. A subsidy lock may deny or limit network access by the telephone if the SIM fails to provide a specified international mobile subscriber identity (IMSI) or other data that insures the phone use revenue is to the particular service provider that subsidized the user handset. The subsidy lock may be applied during the device manufacture.

SUMMARY OF THE INVENTION

A method, telecommunication apparatus, and electronic device for securely creating an identity data block are disclosed. A secure memory may store a unique private key associated with a unique public key. A processor may generate the identity data block in the secure memory using the unique private key. The processor may erase the unique private key from the secure memory.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

A method, telecommunication apparatus, and electronic device for securely creating an identity data block are disclosed. A secure memory may store a unique private key associated with a unique public key. A processor may generate the identity data block in the secure memory and sign the identity data block using the unique private key. The processor may erase the unique private key from the secure memory.

One way to safely and securely create a subsidy lock for a handset may be to create the subsidy lock using a unique private key that may be stored solely at a digital signing server maintained at the handset manufacturer. However, the handset manufacturer may not have access to all the necessary data to create the best subsidy lock, as some of the data may reside with a service provider or a seller farther down the distribution chain. To account for this, the handset manufacturer may store a private key on the handset in a secure memory, with the private key being erased upon the creation of the subsidy lock. Erasing the private key may prevent malefactors from overwriting a legitimate subsidy lock. A mobile handset may leverage a public key infrastructure (PKI) to execute a secure boot to limit the efficacy of certain runtime attacks. By erasing the private key, the mobile handset may ensure that an attacker who achieved a runtime exploit may not re-sign the data block. Further, by erasing the private key, the mobile handset may protect subscriber data, non-subscriber data, or network related data from replacement with an illegitimately signed version.

Figure 1:
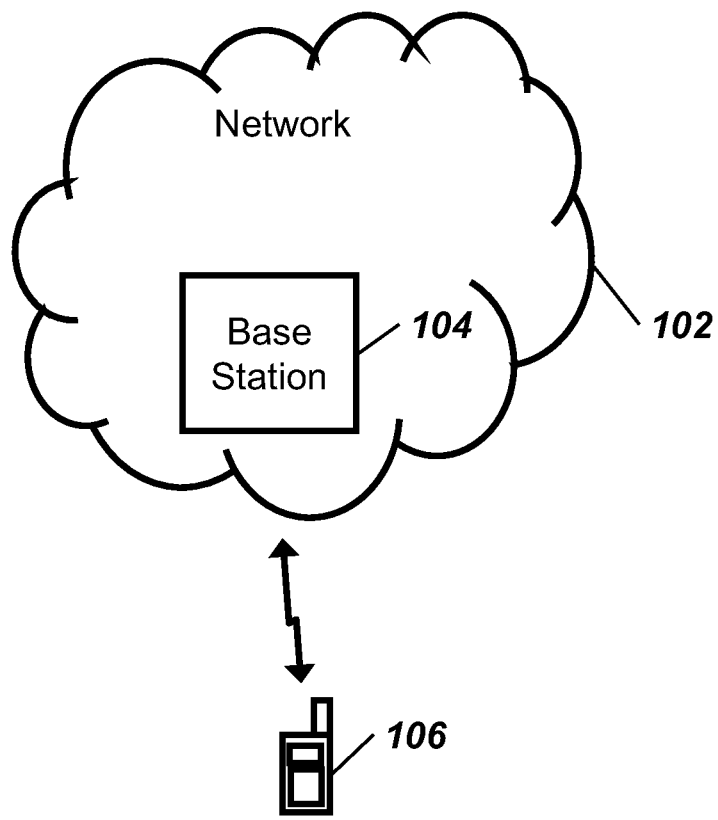
FIG. 1 illustrates one embodiment of a communication system.

FIG. 1 illustrates one embodiment of a communication system 100. The communication system 100 may include a network 102, base station 104, and a mobile device 106, such as a handset, user equipment (UE) or mobile equipment (ME) 106. Various communication devices may exchange data or information through the network 102. The network 102 may be an evolved universal terrestrial radio access (E-UTRA), a Third Generation Partnership Project (3GPP) global system for mobile communication (GSM), a Universal Mobile Telecommunication System (UMTS) or other type of telecommunication network. A network entity, such as the base station 104, may connect the mobile device 106 to the network 102. For one embodiment, the base station 104 may be a distributed set of servers in the network. The mobile device 106 may be one of several types of handheld or mobile devices, such as, a mobile phone, a laptop, or a personal digital assistant (PDA). For one embodiment, the mobile device 106 may be a WiFi® capable device, a WiMax® capable device, or other wireless devices.

Figure 2:
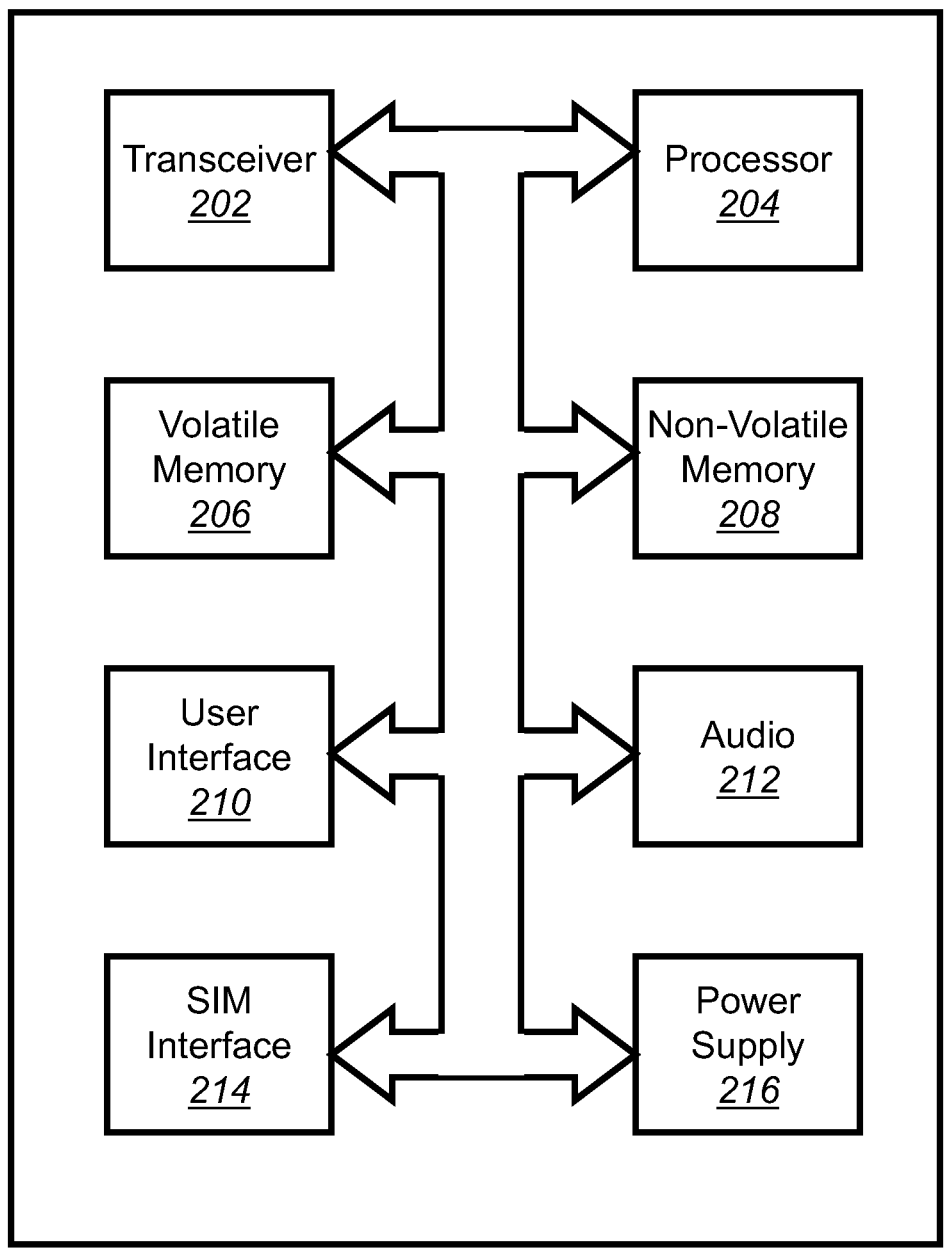
FIG. 2 illustrates, in a block diagram, a possible configuration of a computing system to act as a mobile handset.

FIG. 2 illustrates in a block diagram one embodiment of a computing device 106 that may be used as a mobile device or a mobile handset. The computing device 106 may access the information or data stored in a network 102. The computing device 106 may support one or more applications for performing various communications with the network 102. The computing device 106 may implement any operating system, such as Windows or UNIX, for example. Client and server software may be written in any programming language, such as C, C++, Java or Visual Basic, for example. The computing device 106 may be a mobile phone, a laptop, a personal digital assistant PDA), or other portable device. For some embodiments of the present invention, the computing device 106 may be a WiFi capable device, which may be used to access the network for data or by voice using voice over internet protocol (VOIP). The computing device 106 may include a network interface 202, such as a transceiver, to send and receive data over the network.

The computing device 106 may include a controller or processor 204 that executes stored programs. The controller or processor 204 may be any programmed processor known to one of skill in the art. However, the decision support method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein can be used to implement the decision support system functions of this invention.

The computing device 106 may also include a volatile memory 206 and a non-volatile memory 208 to be used by the processor 204. The volatile 206 and nonvolatile data storage 208 may include one or more electrical, magnetic or optical memories such as a random access memory (RAM, cache, hard drive, or other memory device. The memory may have a cache to speed access to specific data. The memory may also be connected to a compact disc-read only memory (CD-ROM), digital video disc-read only memory (DVD-ROM), DVD read write input, tape drive or other removable memory device that allows media content to be directly uploaded into the system.

The computing device 106 may include a user input interface 210 that may comprise elements such as a keypad, display, touch screen, or any other device that accepts input. The computing device 106 may also include a user output device that may comprise a display screen and an audio interface 212 that may comprise elements such as a microphone, earphone, and speaker. A subscriber identity module (SIM) may be attached to the computing device 106 via a SIM interface 214. Finally, the computing device 106 may include a power supply 216.

Client software and databases may be accessed by the controller or processor 204 from the memory, and may include, for example, database applications, word processing applications, video processing applications as well as components that embody the decision support functionality of the present invention. The user access data may be stored in either a database accessible through a database interface or in the memory. The computing device 106 may implement any operating system, such as Windows or UNIX, for example. Client and server software may be written in any programming language, such as C, C++, Java or Visual Basic, for example.

Figure 3:
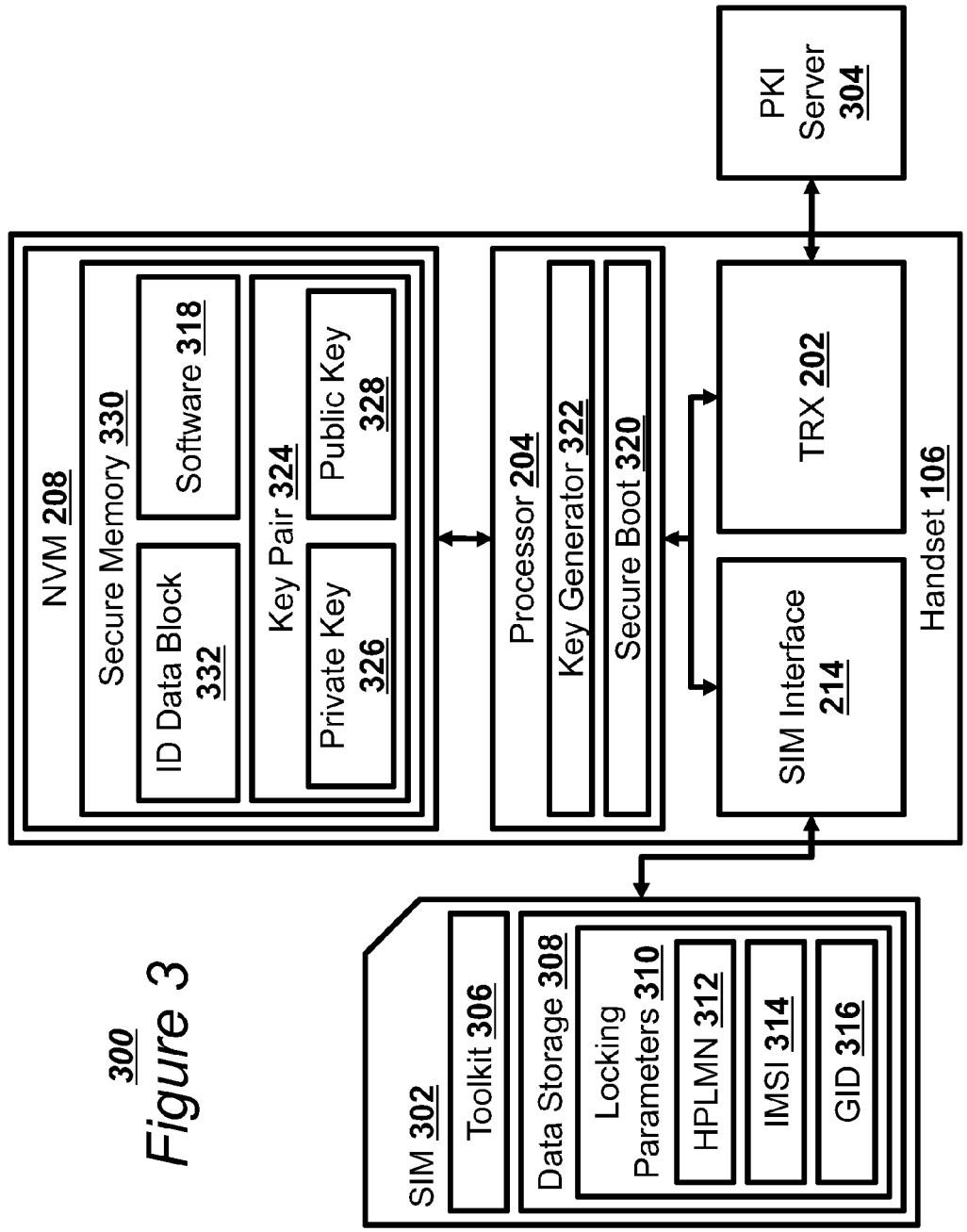
FIG. 3 illustrates, in a block diagram, one embodiment of the interaction between a mobile handset and a subscriber identity module.

FIG. 3 illustrates, a block diagram, one embodiment of the interaction 300 between a mobile handset 106 and a SIM 302. As shown in FIG. 2, the mobile handset 106 may have a transceiver 202, a processor 204, a secure non-volatile memory (NVM) 208, a transceiver (TRX) 202 for connecting to a network 102 base station 104 or a PKI server 304, and a SIM interface 214 for interacting with the SIM 302. Other components of the handset 106 may be present, though not shown in FIG. 3 for purposes of clarity. The secure NVM 208 may be integrity and privacy protected to keep data in the NVM 208 from being corrupted or extracted. The private key may be bound to the mobile handset 106.

The SIM 302 may have modest functionality. The SIM 302 may have a SIM toolkit 306 for executing identity related functions, such as updating the data stored on the SIM 302. The SIM 302 may have a data storage 308, such as an NVM, a volatile memory, a cache or some other means of storing data. The SIM data storage 308 may store SIM copies of the locking parameters 310 and other data. The locking parameters 310 may include a home public land mobile network (HPLMN) identifier 312, an international mobile subscriber identity (IMSI) 314, and a group identifier (GID) number 316, and other identification data. The SIM 302 may transfer the locking parameters 310 to the handset 106 via the SIM IF 214.

The processor 204 may operate a number of functionalities stored as software modules 318 on the NVM 208. Additionally, the processor 204 may execute a secure boot software application 320 to securely verify the authenticity of all software code prior to execution to prevent the execution of malicious code. The processor 204 may execute a key generator program 322 to generate a unique key pair, having a unique private key 326 and an associated unique public key 328, to store in a secure memory 330. The key generator program 322 may use a suitable random number generator block to generate the unique private key 326 and the unique public key 328. The secure memory may be a secure portion of the NVM 208.

A secure memory 330 may store an ID data block 332, a unique public key 328, a unique private key 326 associated with the unique public key 328, and any software modules 318. The ID data block 322 may be any block of data used to identify whether a user is authorized to use the handset in the context of a network, such as how the handset is authorized to use the network being accessed belonging to a particular service provider. The ID data block 332 may be a subsidy lock or an international mobile equipment identifier. The secure memory 330 may store multiple ID data blocks 332. The multiple ID data blocks 332 may have differentiated functions, such as a first ID data block 332 to indicate a subsidy lock type and a second ID data block 332 to implement that subsidy lock type. The processor may compare the ID data block 332 to the locking parameters to determine whether the handset 106 may operate using that SIM 302. The comparison may be executed by a separate firmware module.

A root certificate may be used to validate a subordinate public key 328. The root certificate private key may be stored off the device. The root certificate may be embedded into the device software, to be validated on the secure boot. The handset 106 may use the root certificate to validate a certificate chain, which includes the public key 328. The handset 106 may use the private key 326 to generate the ID data block 332, locking the handset 106 into a specific network, at which point the private key 326 is erased from the secure memory 330. The handset 106 may generate the ID data block 332 by using the private key 326 to digitally sign the ID data block 332.

Figure 4:
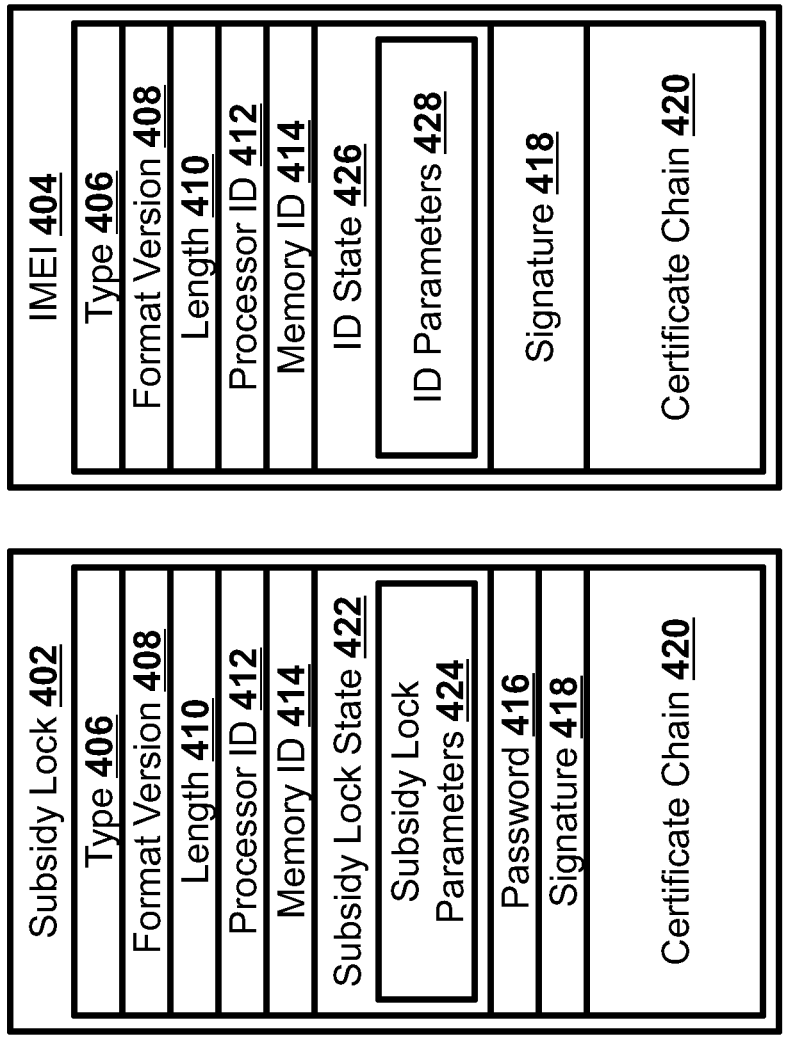
FIG. 4 illustrates, in a block diagram, identity data blocks.

FIG. 4 illustrates, in a block diagram, identity data blocks 400. An identity data block 402 may be used to identify a user, associate that user with the handset 106, and by extension identify the level of permissions a handset 106 may have within a specific network. The identity data block 400 may be a subsidy lock 402, an international mobile equipment identity (IMEI) 404, or other data block used to determine the permission level of a user on a network using the handset 106. If no subsidy lock data block 402 is present, or if it is invalid, the handset 106 may default to a locked state. The identity data block 400 may have a type field 406 identifying the type of identity data block 400, a format version field 408 identifying the format, and a length field 410 identifying the length. The identity data block 400 may have an identifier 412 for the processor 204 of the handset 106 and an identifier 414 for the memory 208 of the handset 106, allowing the identity data block 400 to be locked to a specific handset 106. The identity data block 400 may have a password field 416, indicating a password that may be used to alter the identity data block 400, such as changing the subsidy lock at the end of the subsidy contract. The password 416 may be supplied temporarily at the point of handset distribution or by the end customer to generate a subsidy unlock data block based upon the supplied password 416. The identity data block 400 may have a digital signature 418 with a valid certificate chain 420, to prevent an unauthorized party from simply overwriting the password in an attempt to hack the handset 106.

A subsidy lock 402 may have a subsidy lock state 422 indicating whether the handset 106 is subject to a subsidy lock. The subsidy lock state 422 may contain a set of subsidy lock parameters 424 to show what conditions are to be met for the handset 106 to be in compliance with the subsidy lock. Alternately, an international mobile equipment ID 404 may be associated with an ID state field 426 with a set of ID parameters 428, serving a similar function as the subsidy lock state 422 and subsidy lock parameters 424. The international mobile equipment ID 404 may be static.

Figure 5:
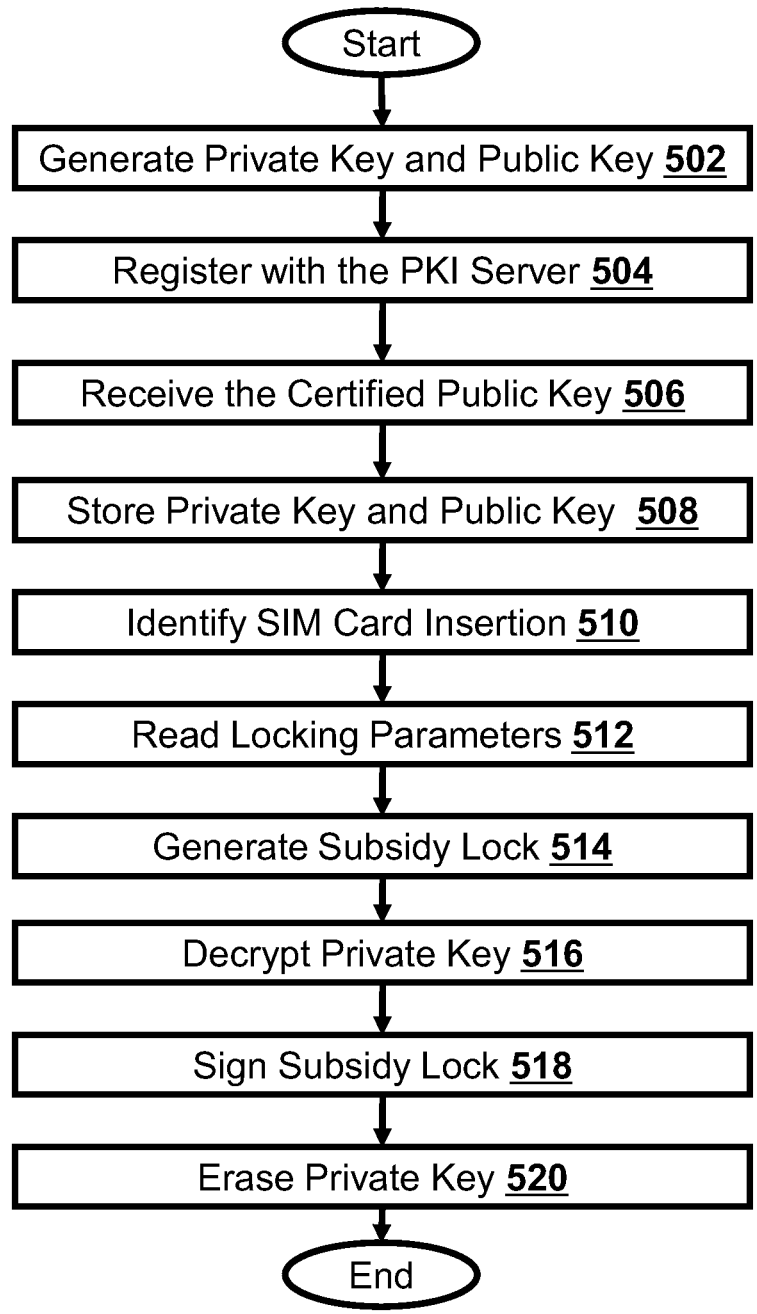
FIG. 5 illustrates, in a flowchart, one method for self-contained generation of identity data blocks.

FIG. 5 illustrates, in a flowchart, one method 500 for self-contained generation of identity data blocks. The key generator 322 may generate a unique key pair 324, having a unique private key 326 and an associated unique public key 328, using a suitable random number generator block (Block 502). The handset 106 may register the associated public key 328 with the PKI server 304 for certification and to bind the associated public key 328 to the specific handset 106 (Block 504). The public key 328 or public key certificate may be bound to the handset by associating the processor ID 412 and/or memory ID 414 with the public key 328, to thereafter prevent a compromised key pair from being useful with another processor and memory, and thus to prevent use of the unique key pair 324 on more than one handset. The PKI server 304 may certify the associated public key 328 by signing the public key certificate 328. After the PKI server 304 has certified the public key 328 generated by the handset 106, the handset 106 may receive the certified public key 328 (Block 506). The secure memory 330 may store the private key 326 and the certified public key 328 (Block 508). The handset may be provided to a distributor, carrier, or other seller with the certified key pair. Thereafter, the SIM interface 214 may identify the initial insertion of a SIM card 302 (Block 510). The SIM interface 214 may read the SIM locking parameters 310 from the SIM card 302 (Block 512). The processor 204 may generate values populated in a subsidy lock 402 based upon the SIM locking parameters 310 received from the initially inserted SIM card 302, binding the handset 106 to that SIM card 302 (Block 514). The processor 204 may decrypt the private key 326 (Block 516). The processor 204 may sign the subsidy lock 402 using the private key 326 to activate the subsidy lock 402 and complete the generation of the subsidy lock 402 (Block 518). For signature purposes, the subsidy lock values may be contained in a data block, which is digitally signed with the private key. The signature may be checked later by code that validates the subsidy lock state, following a process described below. The processor 204 may erase the private key 326 to prevent the subsidy lock 402 from being overwritten (Block 520). Each subsidy lock type may have multiple subsidy lock data blocks, such as a block that enforces the lock and a block that allows the unlock state in response to the appropriate password. Thus, the key pair 324 may be generated and certified. Next, at some later point the SIM card 302 may be inserted or an IMEI may be programmed. Then the subsidy lock data 402 or the IMEI data 404 may be generated and signed with the private key 326 as part of the generated data block. Finally, the private key 326 may be deleted. Thereafter, the software 318 may check the signature 418 on the database to ensure its integrity and, if valid, use the data contained within, as described below.

Figure 6:
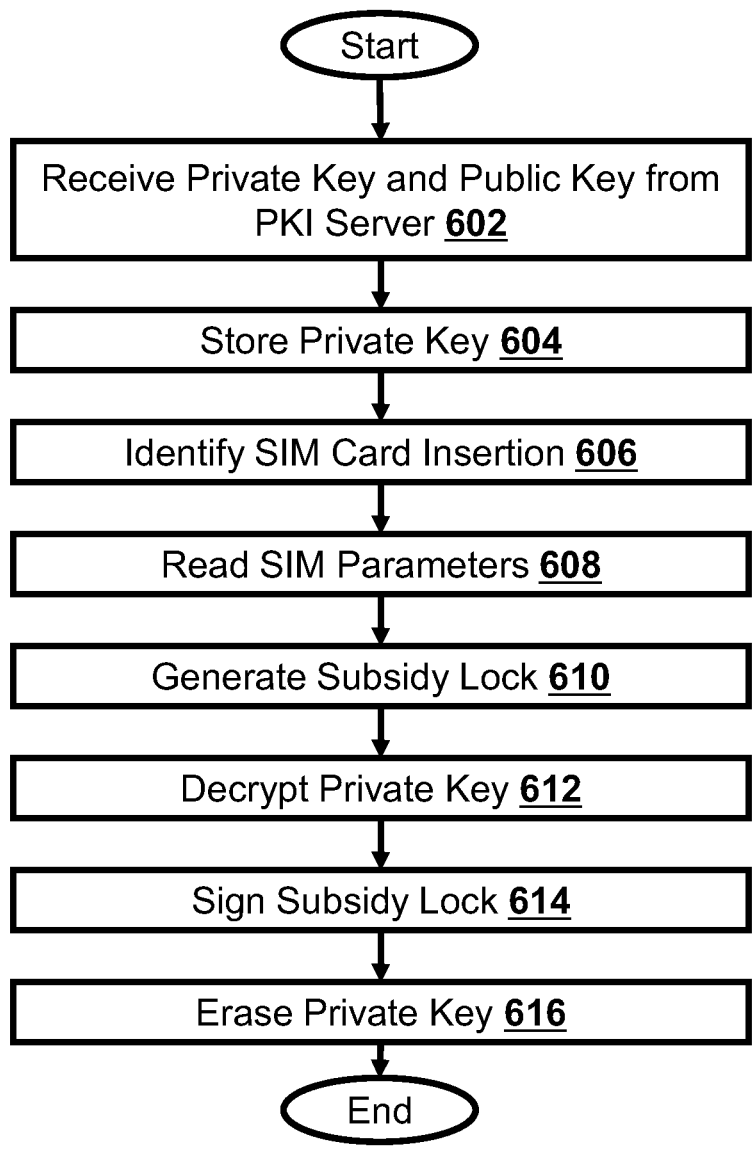
FIG. 6 illustrates, in a flowchart, one method for generation of identity data blocks in conjunction with a public key infrastructure.

FIG. 6 illustrates, in a flowchart, one method 600 for generation of identity data blocks in conjunction with a public key infrastructure. The handset 106 may receive a unique private key 326 and an associated unique public key 328 from the PKI server 304 (Block 602). The PKI server 304 may bind the associated unique public key 328 to the specific handset 106 using the processor ID 412 and memory ID 414. The secure memory 330 may store the private key 326 (Block 604). The SIM interface 214 may identify the initial insertion of a SIM card 302 Block 606). The SIM interface 214 may read the SIM locking parameters 310 from the SIM card 302 (Block 608). The processor 204 may generate a subsidy lock 402 based on the SIM locking parameters 310, binding the handset 106 to that SIM card 302 (Block 610). The processor 204 may decrypt the private key 326 (Block 612). The processor 204 may sign the subsidy lock using the private key 326 to activate the subsidy lock 402 and complete the generation of the subsidy lock 402 Block 614). The processor 204 may erase the private key 326 to prevent the subsidy lock 402 from being re-signed at a later point by unauthorized software (Block 616).

Figure 7:
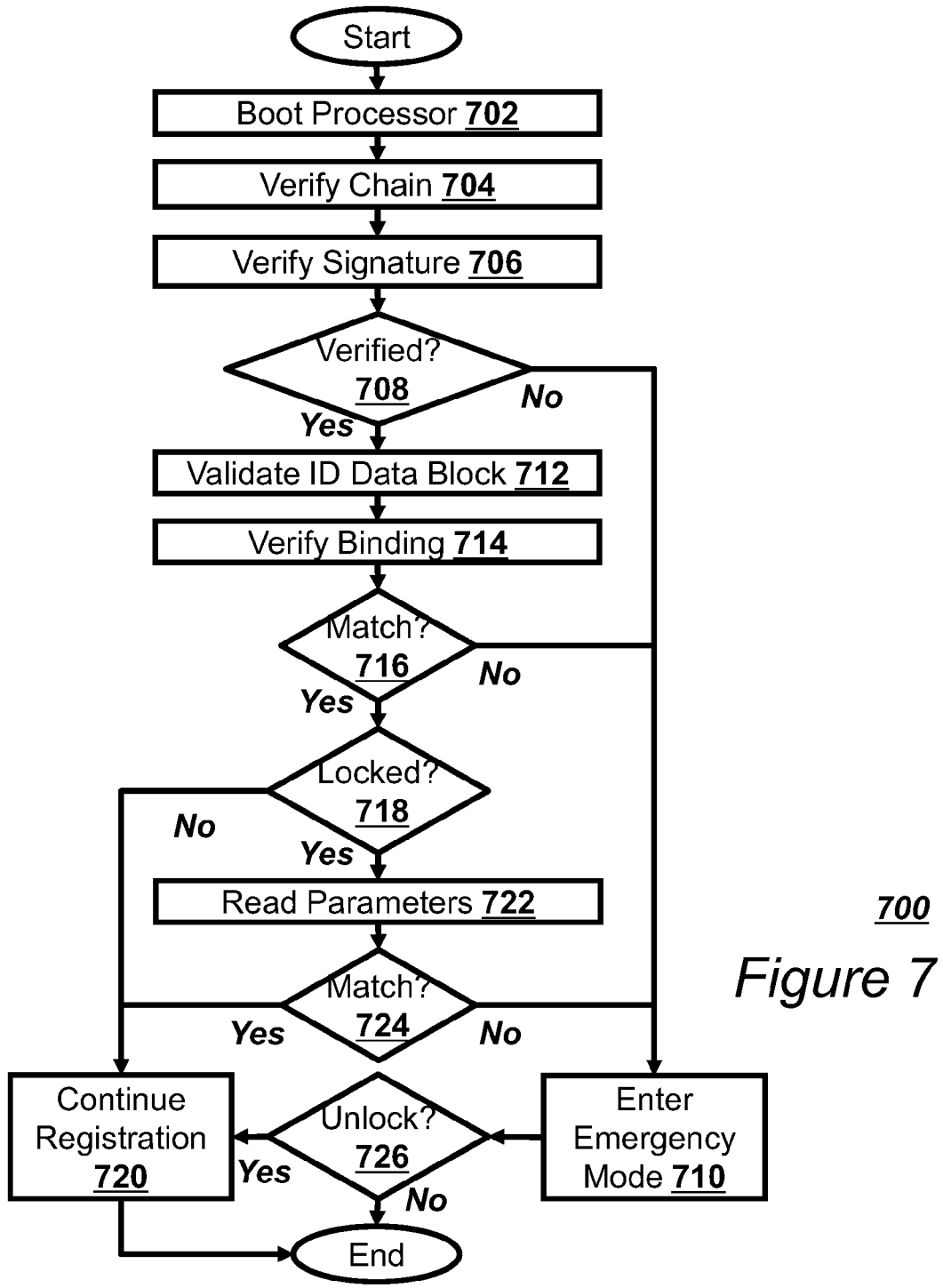
FIG. 7 illustrates, in a flowchart, one method for using a subsidy lock.

FIG. 7 illustrates, in a flowchart, one method 700 for using a subsidy lock. The handset 106 may boot the processor 204 at the initial startup of the handset 106 Block 702). The processor 204 may use the root certificate to verify the stored certificate chain 420 (Block 704). The processor 204 may use the public key 328 in the root certificate, or from a subordinate certificate chain, to verify the digital signature 418 of the subsidy lock 402 and the binding of the unique associated public key 328 to the handset 106 (Block 706). If the digital signature 418 does not verify (Block 708), then the handset 106 may enter an emergency mode Block 710). The emergency mode may allow limited access to the network, such as allowing calls to 911, but may curtail open access to the network. The handset 106 may block telephony functions outside of emergency functions.

If the digital signature is verified (Block 708), the handset 106 may validate the contents of the ID data block 332 (Block 712). The processor 204 may compare the processor ID 412 and memory ID 414 to the actual ID of the processor 204 and the NVM 208 to verify binding to the handset (Block 714). If the processor ID 412 and the memory ID 414 do not match the actual ID of the processor 204 and the NVM 208 (Block 716), then the handset 106 may enter an emergency mode (Block 710). If the handset is not subsidy locked (Block 718), the handset 106 may continue the network registration process with all normal telephony functions available (Block 720). If the handset is subsidy locked (Block 718), the processor 204 may read the SIM locking parameters 310 to be compared with the SIM locking parameters 424 in the ID data block 332 (Block 722). If the SIM locking parameters 310 from the SIM card 302 and the ID data block 332 do not match (Block 724), then the handset 106 may enter an emergency mode (Block 710) and await an unlock event (Block 726). If an unlock event occurs (Block 726), upon successful unlock the handset 106 may enter an unlocked state and continue with network registration (Block 716). An unlock event may be the end of the service contract, at which point the user may enter a password 416 to undo the subsidy lock 402. If the subsidy lock parameters do match (Block 724), then the handset 106 may proceed with normal network registration (Block 720).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for securely creating an identity data block on a mobile device, comprising:
storing in a secure memory of the mobile device a unique private key associated with a unique public key;
receiving subsidy lock data after storing the unique private key;
generating the identity data block using the subsidy lock data and the stored unique private key; and
erasing the stored unique private key from the secure memory.

2. The method of claim 1, wherein the identity data block is at least one of an international mobile equipment identifier or a subsidy lock.

3. The method of claim 1, further comprising:
generating the unique private key and the unique public key on the mobile device; and
sending the unique public key to a public key infrastructure server for certification.

4. The method of claim 1, further comprising:
receiving the unique private key and the unique public key from a public key infrastructure server.

5. The method of claim 1, further comprising:
binding the unique public key to the mobile device.

6. The method of claim 1, further comprising:
generating a subsidy lock upon insertion of a subscriber identity module.

7. The method of claim 1, further comprising:
generating a subsidy lock based upon a subscriber identity module locking parameter.

8. The method of claim 7, wherein the subscriber identity module locking parameter is one of a home public land mobile network identifier, an international mobile subscriber identity, and a group identifier.

9. The method of claim 1, further comprising:
generating a subsidy unlock data block based upon a supplied password.

10. A telecommunications apparatus securely creating an identity data block, comprising:
a secure memory that stores a unique private key associated with a unique public key;
an interface that receives subsidy lock data after storing the unique private key;
a processor that generates the identity data block in the secure memory using the subsidy lock data and the stored unique private key and erases the stored unique private key from the secure memory.

11. The telecommunications apparatus of claim 10, wherein the processor generates the unique private key and the unique public key.

12. The telecommunications apparatus of claim 11, further comprising:
a transceiver that registers the unique public key with a public key infrastructure server for certification.

13. The telecommunications apparatus of claim 10, further comprising:

a transceiver that receives the unique private key and the unique public key from a public key infrastructure server.

14. The telecommunications apparatus of claim 10, further comprising:
a subscriber identity module interface that triggers generating a subsidy lock upon insertion of a subscriber identity module.

15. The telecommunications apparatus of claim 10, wherein the processor generates a subsidy lock based upon a subscriber identity module locking parameter.

16. The telecommunications apparatus of claim 15, wherein the subscriber identity module locking parameter is one of a home public land mobile network identifier, an international mobile subscriber identity, and a group identifier.

17. An electronic device securely creating a subsidy lock, comprising:
a secure memory that stores a unique private key associated with a unique public key;
an interface that receives subsidy lock data after storing the unique private key;
a processor that generates the subsidy lock in the secure memory using the subsidy lock data and the stored unique private key, and erases the stored unique private key from the secure memory, where the stored private key that is erased is the private key that was stored before the subsidy lock data was received.

18. The electronic device of claim 17, further comprising:
a transceiver that receives the unique private key and the unique public key from a public key infrastructure server.

19. The electronic device of claim 17,
wherein the interface comprises a subscriber identity module interface that triggers generating a subsidy lock upon insertion of a subscriber identity module.

20. The electronic device of claim 17, wherein the processor generates a subsidy lock based upon a subscriber identity module locking parameter.

* * * * *